Patented Feb. 23, 1932

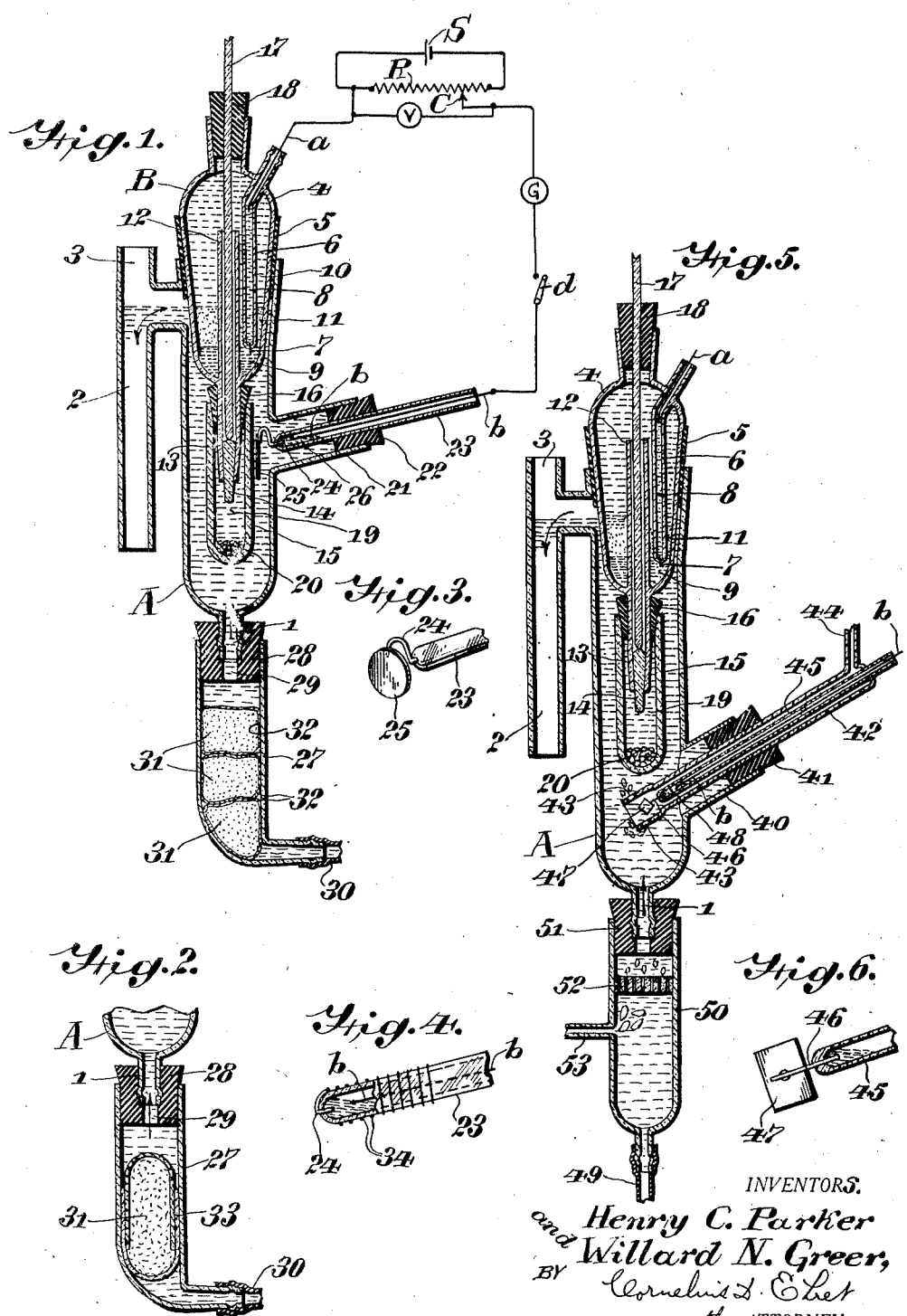

1,846,354

UNITED STATES PATENT OFFICE

HENRY C. PARKER AND WILLARD N. GREER, OF PHILADELPHIA, PENNSYLVANIA, ASSIGNORS TO LEEDS & NORTHRUP COMPANY, OF PHILADELPHIA, PENNSYLVANIA, A CORPORATION OF PENNSYLVANIA

APPARATUS FOR OBTAINING ION CONCENTRATION EFFECTS

Application filed July 30, 1926. Serial No. 125,908.

Our invention relates to a method of and structure for producing an electro-motive-force representative of the concentration of a selected ion, as of hydrogen, hydroxyl, etc., in a solution or electrolyte.

In accordance with our invention, there is added to the test solution or electrolyte, preferably in amount sufficient to effect substantial saturation thereof, an agent for causing the production of an electro-motive-force from which may be determined a characteristic of the aforesaid solution or electrolyte.

Further in accordance with our invention, there is utilized a cell comprising positive and negative electrode structures adapted to be immersed in a test solution or electrolyte for the production of an electro-motive-force, and prior to the passage of said solution or electrolyte to the electrode structures, there is admixed or dissolved therein suitable active material, which may be gaseous, as hydrogen, or solid, as quinhydrone preferably in sub-divided form.

Our invention relates to a cell, as aforesaid, wherein the drop of potential across the electrodes may be utilized for any desired purpose, as for controlling the addition of a chemical to the test solution or electrolyte in which the electrodes are immersed, or may be recorded or indicated, as desired.

Our invention resides in the method and structure of the character hereinafter described and claimed.

For an understanding of some of the various forms our invention may take, reference is to be had to the accompanying drawings, in which:

Fig. 1 is a vertical sectional view of structure constructed in accordance with our invention.

Fig. 2 is a vertical sectional view of a modified form of our invention.

Fig. 3 is a perspective view of a sheet metal electrode.

Fig. 4 is an elevational view, partly in vertical section, of a modified form of electrode.

Fig. 5 is a vertical sectional view of a modified type of cell structure constructed in accordance with our invention.

Fig. 6 is an enlarged perspective view of an electrode plate comprised in the structure of Fig. 5.

Referring to Fig. 1, there is illustrated a complete cell for the production of an electro-motive-force varying with variations in the concentration of a selected ion of a solution or electrolyte which, or a predetermined fraction of which, is in the example shown, continuously passed through the cell structure which comprises the elongated vessel or tube A, of glass or other suitable material. This vessel is provided at one end with an inlet 1 constituting an orifice for the admission of the solution or electrolyte which thereafter flows around the electrode structures and finally passes from the vessel through the discharge outlet 2, preferably provided at its upper end with the opening 3.

Any suitable structure may be utilized for forming the constant half cell. Preferably, however, the half cell is of the character illustrated in the prior application of Parker, Serial No. 32,090, filed July 17, 1925, upon which Patent No. 1,599,483 has been granted, and is herein designated generally at B, and comprises an electrode vessel 4, of glass or other suitable material, supported in the end of the vessel A, a rubber ring 5 or the like preferably being disposed between the adjacent surfaces of said vessels. Electrical communication with the interior of vessel 4 may be effected in any suitable manner, preferably by providing a re-entrant tube 6, into whose lower end is sealed and through which passes a conductor 7, one end of which communicates with the interior of vessel 4, the other end being either directly connected to a conductor $a$ or contacting with a pool of conductive material 8, as mercury, with which is connected the conductor $a$.

For developing a constant electro-motive-force within the vessel 4, contact is effected between a suitable metal and a reference solution maintained at a definite composition and concentration. To this end, there is disposed within vessel 4 a pool of mercury 9, with which contacts a solution of potassium chloride 10, perferably saturated and containing calomel, i. e., monochloride of mercury, a supply of which in powdered form is indicated at 11 above the pool of mercury 9.

Extending upwardly within the vessel 4, as viewed in Fig. 1, is the re-entrant tube-like member 12, of any suitable length sufficient for effecting communication with that part of said vessel containing the reference solution. Tube 12 is also extended downwardly, as viewed in Fig. 1, as a spout-like member 13 whose end is closed by a plug or stopper 14 of glass preferably ground, for restricting the conductive path between the solution in vessel 4 and the solution in a cup or thimble 15 enclosing the spout-like member 13 and secured thereto in any suitable manner, as by the rubber ring 16.

If desired, the member 13, instead of being provided with a plug 14, may be closed in any suitable region with a mass of cotton, glass wool or the like. However, the glass plug 14 is preferably utilized, in which case, for holding said plug in position, there should be provided a rod 17, of glass or the like, held in the rubber stopper 18 closing the upper open end of vessel 4. Thimble 15 should be formed of porous material, preferably unglazed porcelain, and disposed therewithin is a suitable solution 19, preferably saturated, as a desired salt, preferably potassium chloride, which may be maintained in saturated condition by utilizing crystals 20 of potassium chloride, herein shown at the bottom of thimble 15; in this manner, a constant supply of the solution is maintained without using a separate reservoir. In operation, the contents of the thimble gradually diffuse into the test solution and effect restricted contact therewith but, due to the presence of the aforesaid crystals 20, the solution 19 is maintained in a desired saturated condition.

When thimble 15 encloses a potassium chloride solution, the liquid junction potential between such solution and the test solution is greatly reduced.

Disposed in a lateral arm 21 of vessel 4 is a rubber stopper 22 supporting a tube 23 of glass or the like, into whose closed lower end, as viewed in Fig. 1, is sealed a platinum conductor 24, one end of which communicates with the interior of vessel 4 and is suitably connected to a disk 25, of gold, platinum, iridium, or other noble metal, the end of conductor 24 within tube 23 being either directly connected to the conductor $b$ or contacting with a pool of mercury 26, with which the conductor $b$ contacts.

For purposes of illustration merely, and without limitation of our invention, the electrodes are shown as connected with suitable apparatus for measuring voltages or differences of potential which are representative of the ion concentration. In the example shown, such apparatus comprises a potentiometer having a source of current or battery S delivering current through the resistance R, one terminal of which is connected with the positive electrode by way of conductor $a$. Movable along the resistance R is the contact $c$ connected with the galvanometer G, which is upon closure of a switch $d$ with the negative electrode by way of conductor $b$. The contact $c$ is moved along the resistance R to such position that the deflection of the galvanometer G is nil, in which case the fall of potential across that part of the resistance R to the left of the contact $c$ is equal to the potential difference or voltage produced by the positive half cell, and the other electrode in contact with the electrolyte. Such potential difference or voltage may then be directly read upon the deflecting voltmeter V.

In accordance with our invention, there is added to the test solution or electrolyte entering vessel A a suitable agent or material for establishing a condition of oxidation-reduction equilibrium at the noble metal disk 25 of the negative electrode structure. Such agent or material is preferably granular or sub-divided quinhydrone (which is more properly benzo-quinhydrone) although other materials may be utilized as the xylene and toluene homologues of quinhydrone, dialuric acid-allaxan, azo-hydrazo compounds and cystine-cysteine compounds. Therefore, as described above, the test solution is maintained at the desired degree of saturation by effecting contact thereof with the desired agent prior to its admission to the inlet 1. To this end there may be utilized structure of any suitable character, preferably, however, of the type herein disclosed as comprising a tube or vessel 27 of glass or the like, secured to the member forming the inlet 1 by the rubber stopper 28 having a passage 29 communicating with said inlet. By preference, the other end of tube 27 is restricted in diameter, and secured thereto is the conduit or tube 30 of rubber or the like, through which the test solution or electrolye is passed to the interior of tube 27 into engagement with the bodies of quinhydrone 31 contained in suitable receptacles 32, as silk bags or the like. After traversing the tube 27 in an upward direction, as viewed in Fig. 1, at which time quinhydrone is dissolved to form a solution of the desired saturation, preferably approximately complete, the solution pursues its upward course through the passages 29 and 1 to the interior of vessel A, and, after flowing around thimble 15 and the negative electrode structures 24 and 25, passes from said vessel A by way of discharge conduit 2.

Obviously, the quinhydrone may be enclosed in tube 27 in a variety of ways, and as another example of such enclosing structure, there is illustrated in Fig. 2 a capsule 33 of suitable porous material, as unglazed porcelain, housing the mass of quinhydrone 31 in such position that the test solution or electrolyte traversing the tube 27 in an upward direction, as viewed in Fig. 2, must pass through said body of quinhydrone whereby a part thereof is dissolved as described above with respect to Fig. 1.

In Fig. 4 there is illustrated a modified form of negative electrode structure wherein there is utilized a wire or conductor 34 of gold or other noble metal secured to the end of the platinum conductor 24, which in this case is bent back upon the curved end of tube 23, said conductor 34 being thereafter coiled at suitable pitch upon the exterior surface of said tube 23.

In Fig. 5, there is illustrated a modified form of our invention wherein there extends into the vessel A a positive or contant half cell of the character described above, said vessel A also serving as a support for a suitable negative electrode, herein shown as of the Hildebrand type. Accordingly, vessel A is provided with a lateral tube-like extension 40, preferably opening thereinto in a region adjacent the bottom of thimble 15. Disposed in said extension 40 is a rubber stopper 41 supporting a tube 42 of glass or the like, whose end within the vessel is preferably enlarged and comprises a series of perforations 43. Communicating with tube 42 exteriorly of vessel A is the tubular member 44. Preferably formed integrally with tube 42 is the re-entrant tube 45, whose closed end lies in a region somewhat removed from the inner end of said tube 42 and has sealed thereinto a conductor 46, one end of which communicates with the interior of the enlarged end of tube 42 and has secured thereto the plate 47, preferably of sheet platinum, Fig. 6. Conductor 46 extends within tube 45, and is either directly connected to conductor $b$ or connects therewith through the pool of mercury 48 into which said conductor $b$ extends.

In the form of our invention illustrated in Fig. 5, the test solution or electrolyte prior to its admission to vessel A is passed through a tube or conduit 49 suitably secured to the tube or vessel 50 in turn secured to the inlet 1 of vessel A in any suitable manner, preferably by utilizing a rubber stopper 51. Disposed within and across the tube 50 is a disk 52, or equivalent, formed of porcelain or other material incapable of reacting with the solution being tested and provided with a relatively large number of perforations or passages of relatively small diameter, as from 1/32 to 1/64 of an inch, more or less. If found desirable and necessary, a plurality of the disks 52 may be utilized within tube 50. Or, in lieu of one or more of the disks 52, there may be utilized a plug of glass wool or the like.

Communicating with tube 50 is a nipple 53 through which may be passed hydrogen or other gas under suitable pressure. The hydrogen, when used, upon introduction to the interior of tube 50 is carried along by the test solution entering said tube by way of conduit 49, and upon passage through disk 52 the two substances are thoroughly mixed. Thereupon, the solution passes to the interior of vessel A and flows around the positive and negative electrode structures. Meanwhile, hydrogen gas under suitable pressure after admission through nipple 44 passes downwardly through the annular space between tubes 42 and 45 into contact with plate 47, thence through the perforations 43 to the atmosphere. Finally, the solution escapes from vessel A by way of discharge outlet 2. It has been found by experiment that unless the solution is presaturated with hydrogen in this manner a Hildebrand electrode will give incorrect results in a flowing solution which is exposed to the air. By this method of presaturation, however, the substances which adversely affect the electrode (presumably oxygen) are removed or rendered inactive.

What we claim is:

1. A cell for utilizing or determining the concentration of a selected ion comprising a variable half cell, a constant half cell, supporting structure for said half cells comprising a passage traversed by an electrolyte, a conduit carried by said supporting structure and having a passage opening into said first-named passage, and a porous receptacle obstructing the passage through said conduit and containing an active agent to be admixed with the electrolyte.

2. A cell for utilizing or determining the concentration of a selected ion comprising a variable half cell, a constant half cell, supporting structure for said half cells comprising a passage traversed by an electrolyte, a conduit carried by said supporting structure and having a passage opening into said first-named passage, and a porous receptacle obstructing the passage through said conduit and containing quinhydrone.

3. A cell for utilizing or determining the concentration of a selected ion comprising a variable half cell, a constant half cell, supporting structure for said half cells comprising a passage traversed by an electrolyte, a conduit carried by said supporting structure and having a passage opening into said first-named passage, and a porous receptacle obstructing the passage through said conduit and containing granular quinhydrone.

4. A cell for utilizing or determining the concentration of a selected ion in a flowing solution, comprising a flow channel through which the test solution flows upwardly, a constant half cell and a half cell whose potential varies with the concentration of the selected ion supported by the said flow channel, an auxiliary receptacle attached at the lower end of said flow channel through which the flowing solution enters said flow channel, and means within said receptacle for admixing active material with the test solution before the solution enters said flow channel.

5. The combination with an ion concentration cell comprising a negative electrode, an element of noble metal forming part of said electrode, a mixing chamber containing an oxidizing-reducing agent in solid form, and means for effecting continuous flow of an electrolyte to said mixing chamber and of the resulting solution from said mixing chamber to and through said cell in a path including said element.

6. The combination with an ion concentration cell comprising a negative electrode, an element of noble metal forming part of said electrode, a mixing chamber containing subdivided oxidizing-reducing agent, and means for effecting continuous flow of an electrolyte to said mixing chamber and of the resulting solution to and through said cell in a path including said element.

7. The combination with an ion concentration cell comprising a negative electrode, an element of noble metal forming part of said electrode, a mixing chamber containing subdivided quinhydrone, and means for effecting continuous flow of an electrolyte to said mixing chamber and of the resulting solution to and through said cell in a path including said element.

8. A cell for utilizing or determining the concentration of a selected ion comprising a variable half cell, a constant half cell, supporting structure for said half cells comprising a passage traversed by an electrolyte, and a chamber having a passage opening into said first-named passage and substantially obstructed by subdivided quinhydrone.

HENRY C. PARKER.
WILLARD N. GREER.